United States Patent
Wang et al.

(10) Patent No.: US 7,094,372 B1
(45) Date of Patent: Aug. 22, 2006

(54) CHITOSAN MEMBRANE CONTAINING NANO-INORGANIC PARTICLES AND THE METHOD FOR FORMING THE SAME

(75) Inventors: Da-Ming Wang, Taoyuan (TW); Juin-Yig Lai, Taoyuan (TW); Kueir-Rarn Lee, Chung-Li (TW); Pei-Yun Kuo, Taipei (TW); Yu-Huei Su, Tainan (TW)

(73) Assignee: Chung Yuan Christian University, Chung-Li (TW)

( * ) Notice: Subject to any disclaimer, the term of this patent is extended or adjusted under 35 U.S.C. 154(b) by 199 days.

(21) Appl. No.: 10/460,108

(22) Filed: Jun. 12, 2003

(51) Int. Cl.
*B29C 44/04* (2006.01)
*B01D 39/00* (2006.01)
*B01D 39/14* (2006.01)
*B29C 65/00* (2006.01)

(52) U.S. Cl. .................... 264/45.1; 264/41; 210/502.1; 210/500.29

(58) Field of Classification Search ................ 210/640, 210/502.1, 500.29, 500.37; 264/41, 200, 264/45.1; 95/45, 50, 47; 604/367
See application file for complete search history.

(56) References Cited

U.S. PATENT DOCUMENTS

| | | | | |
|---|---|---|---|---|
| 4,424,346 A | * | 1/1984 | Hall et al. ................... 536/20 |
| 4,968,430 A | * | 11/1990 | Hildenbrand et al. ....... 210/640 |
| 4,983,304 A | * | 1/1991 | Tsugita et al. .............. 210/640 |
| 5,006,255 A | * | 4/1991 | Uragami ..................... 210/640 |
| 5,147,550 A | * | 9/1992 | Wijmans et al. ........... 210/640 |
| 5,427,684 A | * | 6/1995 | Diamantoglou et al. ................ 210/500.23 |
| 5,462,866 A | * | 10/1995 | Wang ........................ 435/174 |
| 5,723,601 A | * | 3/1998 | Larsson ..................... 536/103 |
| 5,821,285 A | * | 10/1998 | Khor et al. ................. 524/27 |
| 5,919,583 A | * | 7/1999 | Grot et al. .................. 429/33 |
| 5,993,661 A | * | 11/1999 | Ruckenstein et al. ....... 210/651 |
| 6,063,981 A | * | 5/2000 | Wehner et al. ............. 604/367 |
| 6,156,330 A | * | 12/2000 | Tsukada et al. ............ 424/408 |
| 6,500,233 B1 | * | 12/2002 | Miller et al. ................. 95/50 |
| 6,626,980 B1 | * | 9/2003 | Hasse et al. .................. 95/51 |
| 6,726,744 B1 | * | 4/2004 | Kulprathipanja et al. ...... 95/45 |

OTHER PUBLICATIONS

Yasuhiko Hirabayashi, Development of Pervaporation Methods for Establhishing Water-Recycling system in space Enviroanment. part 6. Removal of Urine Components from Aqueous media by Pervaporation, Http://www.space.gc.ca/asc/pdf/2000Harabayashi.pdf.*
Wang et al. "The First Japan-Taiwan Academic Exchange Program on Membrane Technology in Environment Management" published Jan. 16-20, 2003, pp. 1-6.

* cited by examiner

*Primary Examiner*—Ana Fortuna
(74) *Attorney, Agent, or Firm*—Rosenberg, Klein & Lee (57) ABSTRACT

A chitosan membrane containing nanosize particles is disclosed in this invention. The chitosan membrane comprises a chitosan membrane and nano-inorganic particles. The nano-inorganic particles are uniformly embedded in the chitosan membrane. This invention also discloses a method for forming a chitosan membrane containing nanosize particles. The method comprises a grinding process, a dissolution process, a dispersion process, a blending process, an impurity removing process, a degassing process, a casting process, and a fixation process.

30 Claims, 4 Drawing Sheets

CHITOSAN MEMBRANE CONTAINING NANO-INORGANIC PARTICLES AND THE METHOD FOR FORMING THE SAME

BACKGROUND OF THE INVENTION

1. Field of the Invention

This present invention relates to a polymer membrane, and more particularly, to a chitosan membrane containing nano-inorganic particles and the method for forming the same.

2. Description of the Prior Art

Chitosan is a hydrophilic natural polymer, which has received much attention in recent years. Chitosan is a polysaccharide consisting of [(1,4)-2-amino-2-deoxy-β-D-glucan]. Usually, a deacetylation process is taken to produce chitosan from chitin. Chitin is also a natural polymer and consists of [(1,4)-2-acetamido-2-deoxy-β-D-glucan]. Chitin is the major constituent of the exoskeleton of insects and crustaceous aquatic animals, and also the major constituent of the cell wall of fungus. Chitosan is biodegradable and has the characteristics of excellent biocompatibility and almost no immunoreaction and no toxicity. Furthermore, because of the amino and hydroxyl groups in its molecular structure, chitosan is chemical reactive and is easy to be modified to from a variety of derivatives. For the above reasons, chitosan can be applied in many fields, such as: agriculture, medical and health care, food processing, fine chemicals, waste water treatment, and textile and paper-making industries.

Pervaporation is a membrane separation process that can be employed to separate liquid mixtures. It can be used to separate liquid mixtures with azeotrope. In addition, it comprises the advantages such as easy operation, energy saving, and others. Therefore, pervaporation attracts much attention in industry. The key of the development of pervaporation is the preparation of membranes with excellent separation performance. The separation mechanism is the difference in the penetration rate of each component in the feed to cross the membrane, and the permeation rate is determined by the solubility and the diffusivity of each component in the membrane. The diffusivity is related to the size of the molecule permeating through the membrane and the solubility is related to the affinity between the permeating molecules and the membrane. Thus, a strategy to improve pervaporation performance is to adjust the affinity between the preferred component and the membrane. For example, to synthesize a material with special hydrophilic property or to modify the commercial material for raising the hydrophilicity is practiced. Another application is to control the membrane structure for adjusting the diffusivity of the permeating components in the membrane. Because of its high hydrophilicity and good membrane-forming property, chitosan is a good material for preparation of pervaporations.

Chitosan can be prepared by a dry process, in which the chitosan/acid/water solution is evaporated to remove water and to form dense membranes. However, such membranes cannot be directly used in the pervaporation process because the chitosan membrane would re-dissolve when being in contact with aqueous solution, an effect caused by the residual acid in the membrane. Evan after the removal of the residual acid, the membrane would still be not stable when being applied to the pervaporation process, because of the swelling effect by the feed aqueous solution. Thus, a crossslinking process is usually required. Sulfuric acid, aldehyde, and dialdehyde are common crosslinkers. After cross-linking, although the stability and permselectivuty are improved, the permeation flux is low (Uragami and Tadashi, U.S. Pat. No. 5,006,255), which limits the application of chitosan membranes to pervaporation. Therefore, a new process is still required to prepare chitosan membranes that posses high selectivity, high flux, and high stability for the pervaporation process.

SUMMARY OF THE INVENTION

In accordance with the present invention, a composite chitosan membrane is provided, which posses with high selectivity, high flux, and high stability for the pervaporation process and can reach the requirement for large-scale operation.

It is one of the objects in this invention to provide a chitosan membrane containing nano-inorganic particles and the method for forming the same. In this invention, the nano-inorganic particles are embedded into a chitosan membrane with both characteristics of the organic and inorganic material, and the produced composite membrane has high separation performance. Because of the affinity between chitosan and the used inorganic particles, the nano-inorganic particles could been uniformly dispersed in the chitosan membrane. The addition of inorganic particles is able to promote the mechanical strength and the stability of the composite membrane in aqueous solution. Therefore, the composite membrane can be utilized without cross-linking in pervaporation or other membrane separation processes. Since cross-linking is not needed, the problem of low flux usually encountered with the crossslinked membrane can be resolved.

Furthermore, even with the cross-linking treatment, the addition of inorganic particles can still improve the stability of operation. The separation performance can be further improved by the special adsorption or reaction property of the inorganic particles. Therefore, this present invention does have the economic advantages for industrial applications.

According to the above-mentioned objects, this invention provides a chitosan membrane containing nano-inorganic particles, wherein the composite chitosan membrane comprises chitosan, and nano-inorganic particles. The nano-inorganic particles are embedded and uniformly dispersed in the structure of the composite chitosan membrane. A method for forming a chitosan membrane containing nano-inorganic particles is also disclosed in this invention. The above-mentioned method comprises a grinding process, a dissolution process, a blending process, a dispersion process, an impurity removing process, a degassing process, a casting process, and a fixation process.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENTS

What is probed into in the invention is about a chitosan membrane and a method for forming the same. Detailed steps in production, structure and elements will be provided in the following description in order to make the invention thoroughly understood. Obviously, the application of the invention is not confined to specific details familiar to those who are skilled in the chitosan membrane. On the other hand, the common elements and procedures that are known to everyone are not described in the details to avoid unnecessary limits of the invention. Some preferred embodiments of the present invention will now be described in greater detail in the following. However, it should be recognized that the present invention can be practiced in a wide range of other embodiments besides those explicitly described, that is, this invention can also be applied extensively to other embodiments, and the scope of the present invention is expressly not limited except as specified in the accompanying claims.

Figure 1:
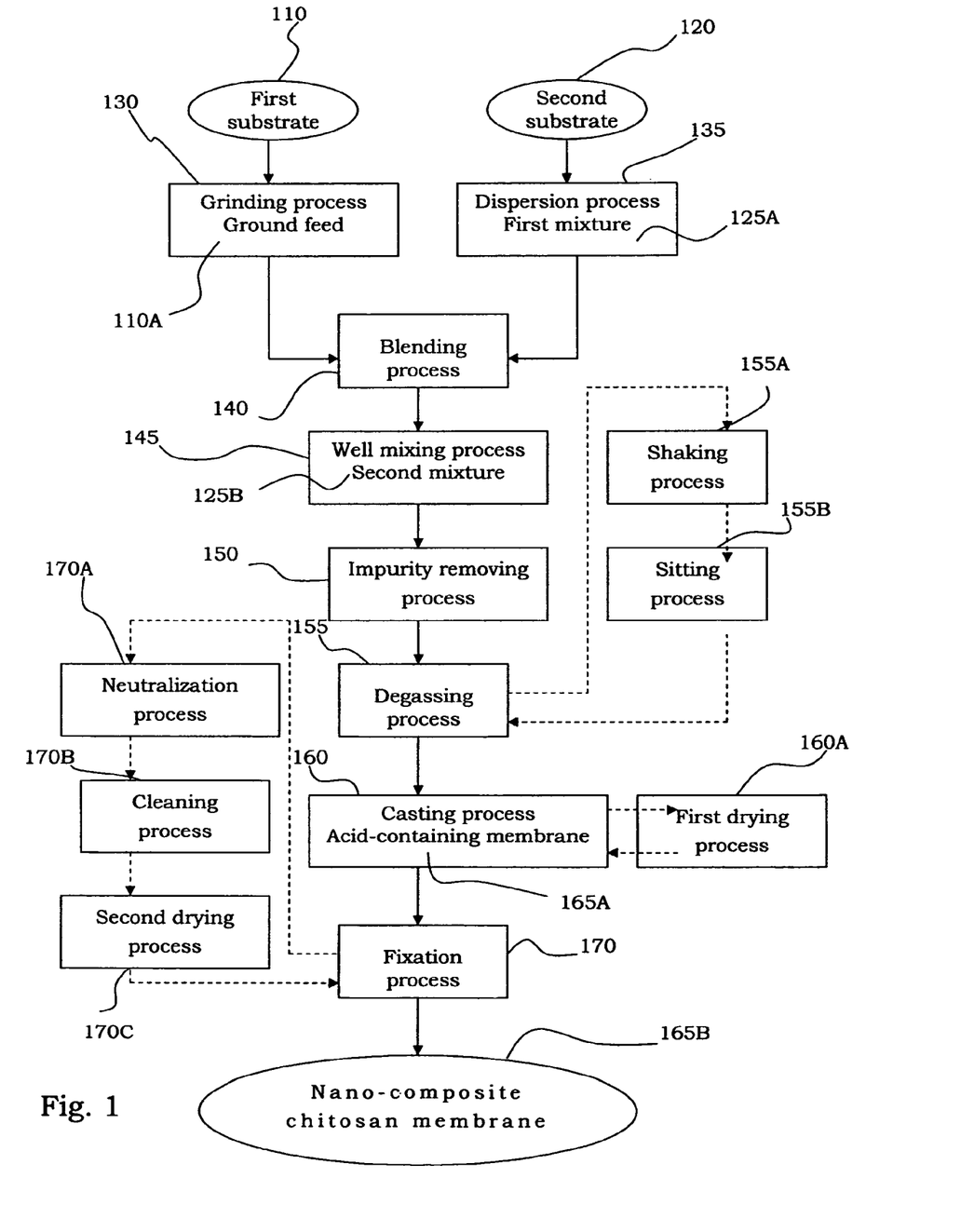
FIG. 1 shows a flowchart of forming a chitosan membrane containing nanosize A-type zeolite particles of the first preferred embodiment according to this present invention.

Referring to FIG. 1, in the first preferred embodiment of this invention, a first substrate 110 comprising chitosan and a second substrate 120 are provided. The second substrate 120 comprises an inorganic particle, and the inorganic particle comprises an inorganic particle with affinity for chitosan. The above-mentioned inorganic particle with affinity for chitosan comprises a hydrophilic inorganic particle, such as an A-type zeolite (the ratio of $SiO_2/Al_2O_3$ is 1:1) or a 5A zeolite ($CaO \cdot Al_2O_3 \cdot 2SiO_2$). The content of the second substrate 120 is about 1 wt % to 75 wt % of the first substrate 110. Besides, the first substrate 110 further comprises a chitosan with a molecular weight about 70,000 to 700,000. A grinding process 130 is then performed to grind the first substrate 110, and a ground feed 110A is produced. Next, the second substrate 120 is delivered into a mixing apparatus, and a dispersion process 135 is performed to disperse the inorganic particles of the second substrate 120 in a dispersing agent, and then a first mixture 125A is forming. It is one of the objects of the dispersion process 135 to transform the second substrate 120 into nano-inorganic particles. The dispersing agent comprises an organic-acid aqueous solution, such as: acetic-acid aqueous solution. After the dispersion process, the diameter of the nano-inorganic particles is dependent on the concentration of the acetic-acid aqueous solution. Generally, when the concentration of the acetic-acid aqueous solution is in a suitable range, the nano-inorganic particles can disperse more uniformly. Therefore, the pH of the acetic-acid aqueous solution is about 1.8 to 3.4.

Referring to FIG. 1, in this embodiment, after the dispersion process 135, the ground feed 110A is added to the first mixture 125A, and a blending process 140 is performed to dissolve the ground feed 110A into the first mixture 125A. A well-mixing process 145 is performed in the mixing apparatus to form a second mixture 125B. The second mixture 125B is subsequently transferred to a separation apparatus and an impurity removing process 150 is performed to remove the impurities from the second mixture 125B, wherein the impurity removing process further comprises a filtration process. After the impurity removing process 150, the second mixture 125B is delivered to a degassing apparatus and a degassing process 155 is performed to remove the bubbles from the second mixture 125B. The degassing process 155 comprises a shaking process 155A and a sitting process 155B. The shaking process 155A further comprises an ultrasonic shaking process. Afterwards, the second mixture 125B is transported to a casting apparatus and a casting process 160 is performed to form an acid-containing chitosan membrane 165A that contains nano-inorganic particles. The casting process 160 comprises a first drying process 160A, and the casting apparatus comprises a first drying device. During the casting process 160, the second mixture 125B is transported into the casting apparatus and the first drying process 160A is performed for forming the acid-containing chitosan membrane 165A with specific shape and thickness. Generally, the drying temperature is dependent on the concentration of chitosan. In order to avoid the aggregation of the nano-inorganic particles, the temperature of the first drying process 160A increases with decreasing chitosan concentration. The temperature of the first drying process 160A comprises 10° C. to 100° C. In addition, with larger amount of the casting solution 125B, the resulted membrane is thicker, and longer drying time is needed for the first drying process 160A.

Referring to FIG. 1, in this embodiment, after the casting process 160, the acid-containing nanocomposite chitosan membrane 165A is transported to a fixation apparatus, and a fixation process 170 is performed to form a stabilized inorganic-particles/chitosan membrane 165B with specific shape and thickness. The fixation process 170 comprises a neutralization process 170A, a cleaning process 170B, and a second drying process 170C. The fixation apparatus comprises a neutralization apparatus, a cleaning apparatus, and a second drying apparatus. After the neutralization process 170A performed in the neutralization apparatus, a neutralization by-product is formed. Subsequently, the by-product of neutralization is removed by the cleaning process 170B. The process 170A comprises an immersing step into an alkaline solution, wherein the alkaline solution is about 1N to 10N. The alkaline solution further comprises a sodium hydroxide solution. The cleaning agent used in the cleaning process 170B comprises a volatile solution for washing, wherein the volatile solution for washing further comprises an ethanol aqueous solution. The ethanol solution contains about 10 to 99 wt % of ethanol. The temperature in the second drying process 170C is about 10° C. to 70° C. The second drying apparatus further comprises a baking apparatus or a vacuum apparatus.

Figure 2:
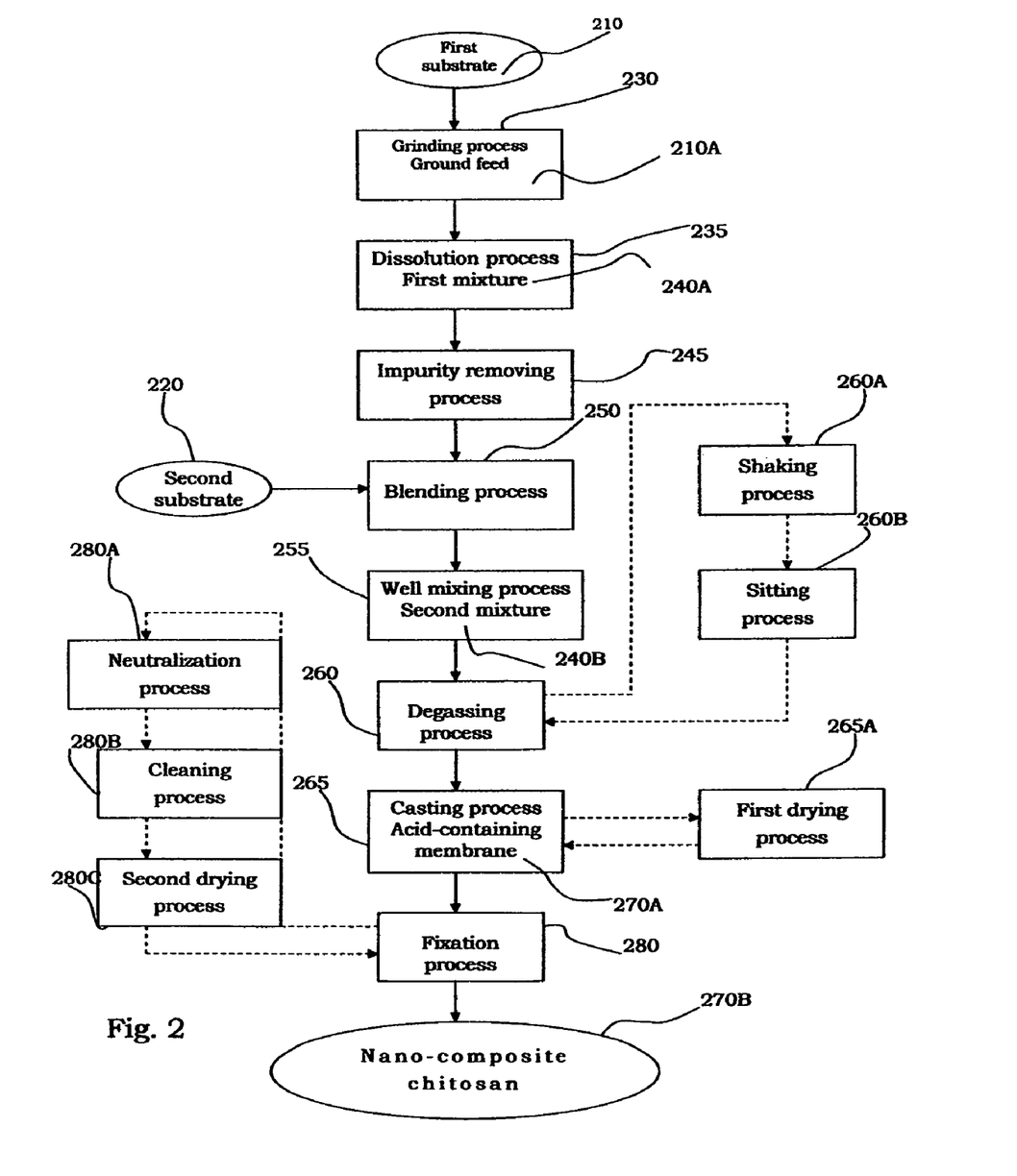
FIG. 2 shows a flowchart of forming a chitosan membrane containing nanosize particles of A-type zeolite or silica of the second preferred embodiment according to this invention.

Referring to FIG. 2, in the second preferred embodiment of this invention, first of all, a first substrate 210 comprising chitosan and a second substrate 220 are provided, wherein the second substrate 220 comprises an inorganic particle. The above-mentioned inorganic particle comprises an inorganic particle with affinity for chitosan. The above-mentioned inorganic particle with affinity for chitosan further comprises a nanosize silicate or an A-type zeolite (the ratio of $SiO_2/Al_2O_3$ is 1:1), such as a 5A zeolite ($CaO \cdot Al_2O_3 \cdot 2SiO_2$). The nanosize silicate further comprises a nanosize silica. In the case of nanosize silica, the content of the second substrate 220 is about 1% to 50% of the first substrate 210. Besides, the first substrate 210 comprises a chitosan with a molecular weight about 70,000 to 700,000. Subsequently, a grinding process 230 is performed to grind the first substrate 210 for forming a ground feed 210A comprising a chitosan. Next, the ground feed 210A is delivered to a mixing apparatus, and a dissolution process 235 is performed for dissolving the chitosan in the ground feed 210A in a solvent and forming a first mixture 240A, wherein the solvent comprises an organic-acid aqueous solution, such as an acetic-acid aqueous solution. Afterwards, the first mixture 240A is transported to a separation apparatus, and an impurity removing process 245 is performed to remove the impurities from the first mixture 240A, wherein the impurity removing process 245 further comprises a filtration process. After the impurity removing process 245, the second substrate 220 is transported to a mixing apparatus, and a blending process 250 is performed to disperse the second substrate 220 in the first mixture 240A. In the mixing apparatus, a well-mixing process 255 is employed, and a second mixture 240B is formed therein. The diameter of the inorganic particle depends on the concentration of the acetic-acid aqueous solution. When the concentration of the acetic-acid aqueous solution is in a suitable range, the inorganic particles can disperse more uniformly. The pH of the acetic-acid aqueous solution is about 1.2 to 1.7.

Referring to FIG. 2, in this embodiment, after the well-mixing process 255, the second mixture 240B is delivered to a degassing apparatus, and a degassing process 260 is performed to remove the bubbles from the second mixture 240B. The degassing process 260 comprises a shaking process 260A and a sitting process 260B. The shaking process 260A further comprises an ultrasonic shaking process. Subsequently, the second mixture 240B is transported to a casting apparatus, and a casting process 265 is performed to form an acid-containing chitosan membrane 270A that contains nano-inorganic particles. The casting process 265 comprises a first drying process 265A, and the casting apparatus comprises a first drying device. During the casting process 265, the second mixture 240B is transported into the casting apparatus and the first drying process 265A is performed for forming the acid-containing membrane 270A with specific shape and thickness. Generally, the drying temperature is dependent on the concentration of chitosan. In order to avoid the aggregation of the nano-inorganic particles, the temperature of the first drying process 265A increases with decreasing chitosan concentration. The temperature of the first drying process 265A comprises 10° C. to 100° C. In addition, with larger amount of the casting solution, the resulted membrane is thicker, and longer drying time is needed for the first drying process 265A.

Referring to FIG. 2, in this embodiment, after the casting process 265, the acid-containing membrane 270A is transported to a fixation apparatus, and a fixation process 280 is performed to form a stabilized inorganic-particles/chitosan membrane 270B with specific shape and thickness. The fixation process 280 comprises a neutralization process 280A, a cleaning process 280B, and a second drying process 280C. The fixation apparatus comprises a neutralization apparatus, a cleaning apparatus, and a second drying apparatus. After the neutralization process 280A performed in the neutralization apparatus, and a by-product of neutralization is formed. Subsequently, the by-product of neutralization is removed by the cleaning process 280B in the cleaning apparatus. The cleaning agent is then removed by the second drying process 280C in the second drying apparatus. The neutralization process 280A comprises an immersing step. The neutralization process 280A further comprises an alkaline solution, wherein the alkaline solution is about 1N to 10N. The alkaline solution further comprises a sodium hydroxide solution. The cleaning agent used in the cleaning process 280B comprises a volatile solution for washing, wherein the volatile solution for washing further comprises an ethanol solution. The ethanol solution contains about 10~99 wt % of ethanol. The temperature in the second drying process 280C is about 10° C. to 70° C. The second drying apparatus further comprises a baking apparatus or a vacuum apparatus. Additionally, if the inorganic particle of this present embodiment is A-type zeolite, the operation condition of this present embodiment may refer to the operation condition described in the first embodiment.

Figure 3:
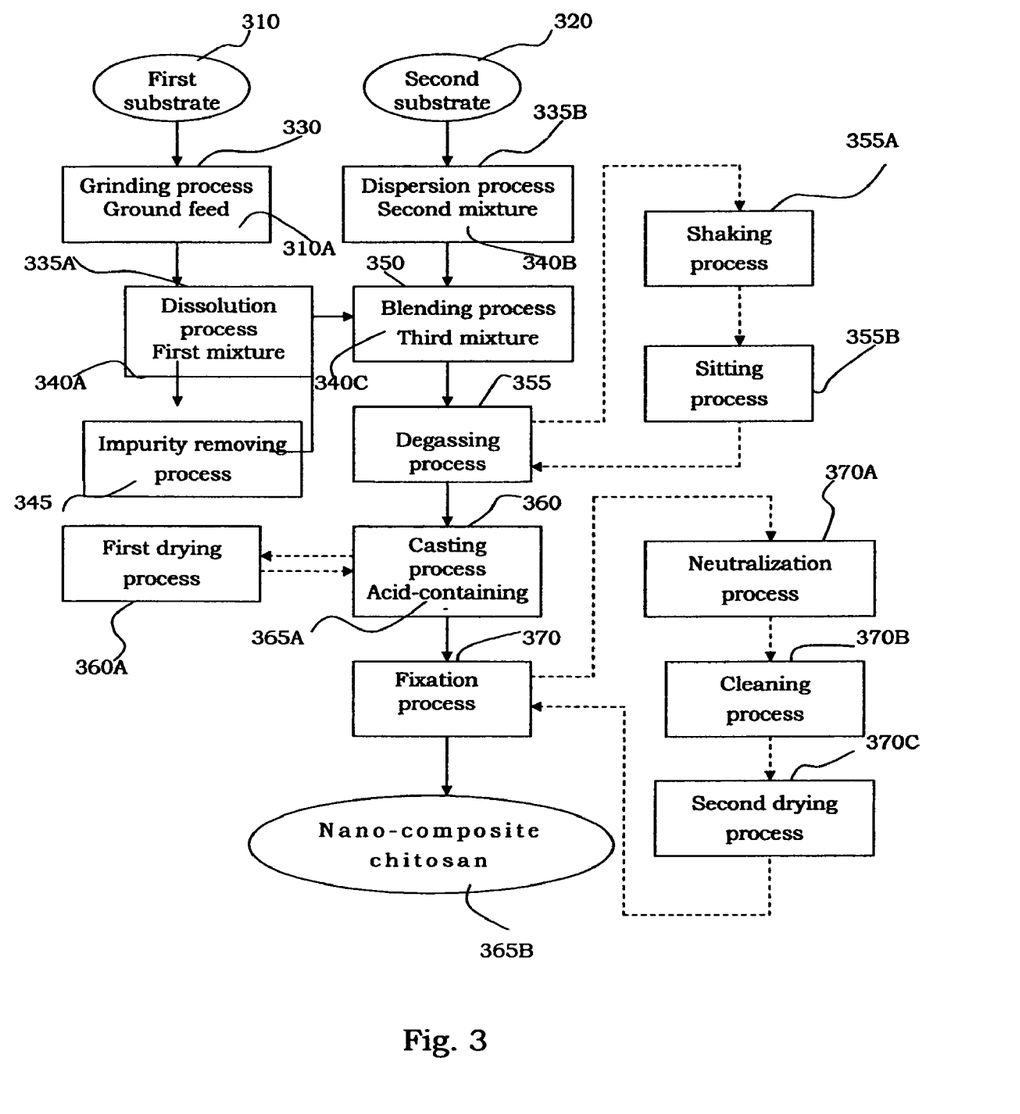
FIG. 3 shows a flowchart of forming a chitosan membrane containing nanosize particles of A-type zeolite or clay of the third preferred embodiment according to this invention.

Referring to FIG. 3, in the third preferred embodiment of this invention, firstly, a first substrate 310 and a second substrate 320 are provided, wherein the second substrate 320 comprises an inorganic particle. The inorganic particle further comprises an inorganic particle with affinity for chitosan. The above-mentioned inorganic particle with affinity for chitosan further comprises an A-type zeolite, or a clay $(Ca^{2+}_{0.084} \cdot Na^{+}_{0.143}[Al_{1.69}Mg_{0.31}]Si_4O_{10}(OH)_2 \cdot H_2O)$. In the case of clay, the content of the second feed 320 is about 1 wt % to 30 wt % of the first feed 310. The first feed 310 further comprises a chitosan with a molecular weight 70,000 to 700,000. Subsequently, a grinding process 330 is performed to grind the first substrate 310 for forming a ground feed 310A. Next, the ground feed 310A is delivered to a first mixing apparatus, and a dissolution process 335A is performed for dissolving the chitosan in the ground feed 310A in a solvent and forming a first mixture 340A, wherein the dissolving solvent comprises an organic-acid aqueous solution, such as an acetic-acid aqueous solution.

Referring to FIG. 3, in this embodiment, after the first dissolution process 335A, the first mixture 340A is transported to a separation apparatus, and an impurity removing process 345 is performed for removing the impurities in the first mixture 340A. The impurity removing process 345 further comprises a filtration process. After the impurity removing process 345, the second substrate 320 is transported to a second mixing apparatus, and a dispersion process 335B is performed for dispersing the second substrate 320 in a dispersing agent and forming a second mixture 340B. It should be noted that, if the second substrate 320 comprises clay, the dispersing agent comprises an aqueous solution, and the second substrate 320 is about 1 wt % to 30 wt % of the second mixture 340B. Next, the first mixture 340A and the second mixture 340B are transported to a mixing apparatus, and a blending process 350 is performed for forming a third mixture 340C. Note that, the diameter of the nano-inorganic particles is dependent on the concentration of the acetic-acid aqueous solution. Generally, when the concentration of the acetic-acid aqueous solution is in a suitable range, the nano-inorganic particles can disperse more uniformly. Therefore, the pH of the third mixture 340C is controlled at about 1.8 to 4. After that, the third mixture 340C is transported to a degassing apparatus, and a degassing process 355 is performed for removing the bubbles from the third mixture 340C, wherein the degassing process 355 comprises a shaking process 355A and a sitting process 355B. The shaking process 355A further comprises an ultrasonic shaking process. Subsequently, the third mixture 340C is transported to a casting apparatus, and a casting process 360 is performed to form an acid-containing chitosan membrane 365A that contains nano-inorganic particles. The casting process 360 comprises a first drying process 360A, and the casting apparatus comprises a first drying device, for example, a baking device. In the casting process 360, the third mixture 340C is transported to the casting apparatus, and the first drying process 360A is performed for forming the acid-containing membrane 365A with specific shape and thickness. Generally speaking, the drying temperature is dependent on the concentration of chitosan. In order to avoid the aggregation of the nano-inorganic particles, the temperature in the first drying process 360A increases with decreasing concentration. The temperature in the first drying process 360A comprises 10° C. to 100° C. In addition, with larger amount of the casting solution, the resulted membrane is thicker, and longer drying time is needed for the first drying process 360A.

Referring to FIG. 3, in this embodiment, after the casting process 360, the acid-containing membrane 365A is transported to a fixation apparatus, and a fixation process 370 is performed to form a stabilized inorganic particles/chitosan membrane 365B with specific shape and thickness. The fixation process 370 comprises a neutralization process 370A, a cleaning process 370B, and a second drying process 370C. The fixation apparatus comprises a neutralization apparatus, a cleaning apparatus, and a second drying apparatus. After the neutralization process 370A performed in the neutralization apparatus; a neutralization by-product is formed. Subsequently, the by-product of neutralization is removed by the cleaning process 370B in the cleaning apparatus. The cleaning agent is then removed by the second drying process 370C in the second drying apparatus. The neutralization process 370A comprises an immersing step. The neutralization process 370A further comprises an alkaline solution, wherein the alkaline solution is about 1 N to 10N. The alkaline solution further comprises a sodium hydroxide solution. The cleaning solution of the cleaning process 370B comprises a volatile solution for washing, wherein the volatile solution for washing further comprises an ethanol solution. The ethanol solution is about 10 to 99 wt % of ethanol. The temperature in the second drying process 370C is about 10° C. to 70° C. The second drying apparatus further comprises a baking apparatus or a vacuum apparatus. Additionally, if the inorganic particle of this present embodiment is A-type zeolite, the operation condition of this present embodiment may refer to the operation condition described in the first embodiment. For example, when the second substrate 320 comprises A-type zeolite, the dispersing agent comprises an organic-acid aqueous solution.

According to the above-mentioned embodiments, this invention discloses a technology about embedding nano-inorganic particles into a chitosan membrane. Because the particles are on the nano-scale, they can be incorporated in the matrix of polymer chains. The key of forming the nanocomposite chitosan membrane is to keep uniform dispersion of the particles in the chitosan solution, and prevent them from aggregation during the casting process and the first drying process. If the nano-particles can be uniformly dispersed in the chitosan solution is strongly related to how the casting solution is prepared. An important key is to control the particle concentration and the solution pH within a suitable range. In addition, when different kinds of particles are employed, the above-mentioned particle concentration and solution pH should be adjusted accordingly. Taking the A-type zeolite as an example, when the solution pH is about 3.0, the zeolite particles are dispersed in the solution with a diameter of about 100 nm; on the other hand, when the pH is about 2.1, the particles are dispersed with a diameter of about 20 nm. For the letter case, more uniform dispersion and smaller particles are obtained.

According to the above description, this invention discloses a chitosan membrane containing nano-inorganic particles and the method for forming the same. The method for producing the chitosan membrane containing nano-inorganic particle comprises the following steps. First of all, a first feed comprising a chitosan and a second feed comprising a nano-inorganic particle are provided. Subsequently, a blending process is performed for well mixing the first and the second feed and forming a mixture. After the blending process, an impurity removing process is performed to remove impurities from the mixture. A degassing process is then followed for removing the bubbles in the mixture. Afterwards, a casting process is performed for forming an acid-containing membrane with specific shape and thickness. Finally, a fixation process is performed for neutralizing the membrane and forming a stabilized chitosan membrane containing nano-inorganic particles.

Figure 4:
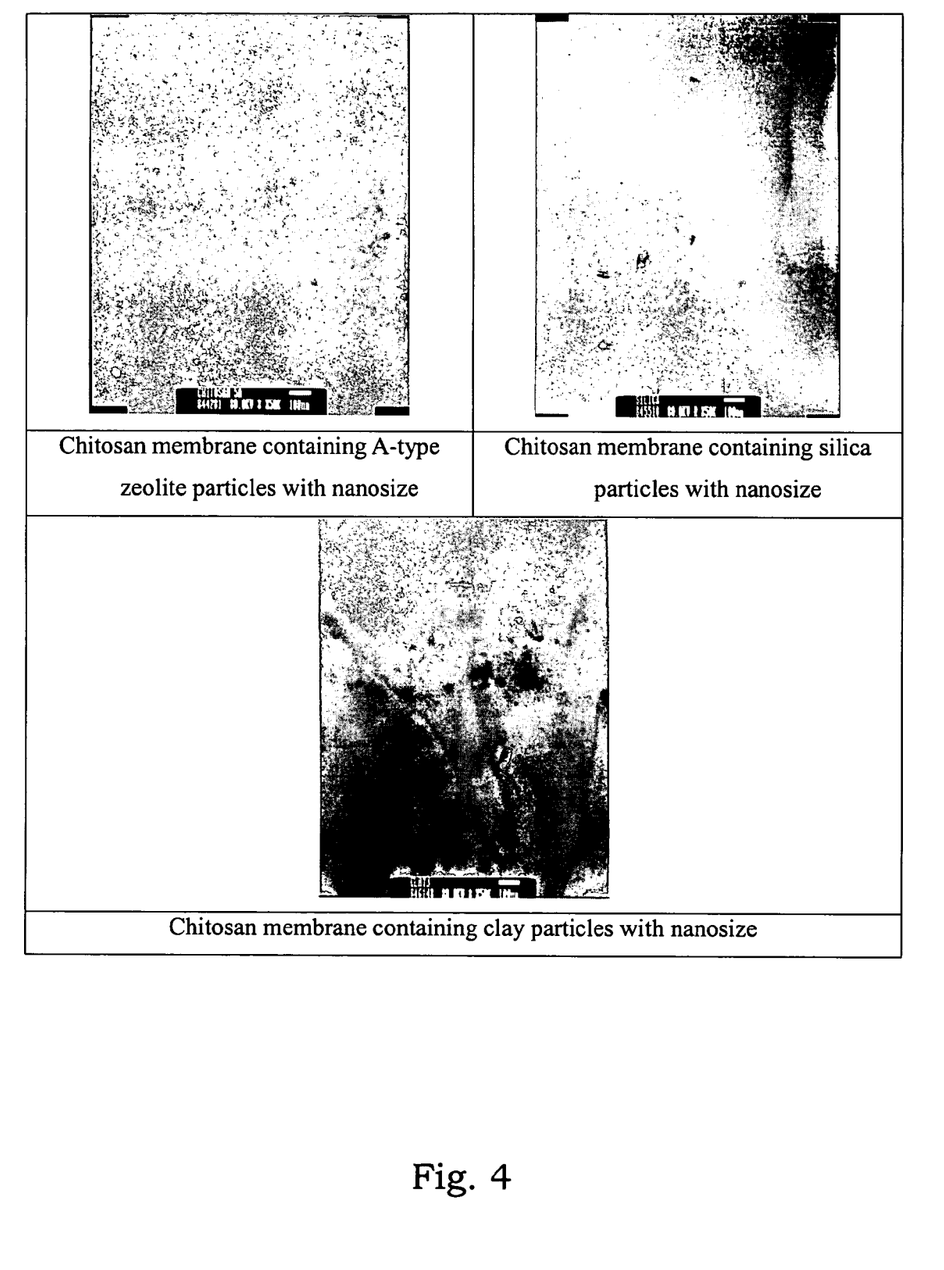
FIG. 4 shows a TEM picture of a chitosan membrane containing nano-inorganic particles according to this invention.

In these embodiments of the present invention, the prepared nanocomposite chitosan membrane comprises a chitosan substrate, and a plurality of nano-inorganic particles, wherein the nano-inorganic particles comprise inorganic particles with affinity for chitosan. The nano-inorganic particles further comprise A-type zeolite, silica, and clay. The TEM pictures of the chitosan membranes containing the above-mentioned three nano-inorganic particles are shown in FIG. 4. Obviously, besides the preparation of chitosan membranes containing nano-inorganic particles, the design of this invention can also be applied to the preparation of other polymeric membranes that contain nano-inorganic particles.

Although three specific embodiments have been illustrated and described, it will be obvious to those skilled in this art that various modifications may be made without departing from what is intended to be limited solely by the appended claims. Obviously, many modifications and variations of the present invention are possible in light of the above teachings. It is therefore to be understood that within the scope of the appended claims, the present invention may be practiced otherwise than as specifically described herein.

What is claimed is:

1. A method for forming a chitosan membrane containing a nano-particle, comprising:

providing a first feed comprising a chitosan;

providing a second feed comprising A type zeolite or clay, wherein a dispersion process is performed to fabricate said second feed, and said dispersion process comprises an organic-acid aqueous solution to transform said A type zeolite or clay into a nano-particle and uniformly disperse said nano-particle, wherein said organic-acid aqueous solution comprises a pH about 1.8 to 3.4;

performing a blending process to mix said first feed and said second feed, so as to form a mixture;

performing an impurity removing process to remove impurities from said mixture; and performing a casting process for forming a chitosan membrane containing a nano-particle by said mixture with specific shape and thickness.

2. The method according to claim 1, wherein a content of said A type zeolite or clay is 1 wt % to 75 wt % of said chitosan.

3. The method according to claim 1, wherein said impurity removing process comprises a filtration process.

4. The method according to claim 1, wherein said impurity removing process comprises a degassing process to remove bubbles from said mixture with a nano-inorganic particle.

5. The method according to claim 1, wherein said casting process comprises a first drying process.

6. The method according to claim 5, wherein the drying temperature of said first drying process increases with decreasing concentration of said chitosan.

7. The method according to claim 5, wherein the drying time of said first drying process increases with increasing amount of the casting solution.

8. The method according to claim 5, wherein the drying temperature of said first drying process is about 10° C. to 100° C.

9. The method according to claim 1, further comprising a fixation process after said casting process, wherein said fixation process comprises:
performing a neutralization process for neutralizing said chitosan membrane containing nano-inorganic particle by an alkaline solution and a by-product of neutralization is formed after said neutralization process;
performing a cleaning process to remove said product of neutralization from said chitosan membrane containing a nano-inorganic particle; and
performing a second drying process for removing the cleaning agent from said chitosan membrane containing a nano-inorganic particle.

10. The method according to claim 9, wherein said alkaline solution is about 1N to 10N.

11. The method according to claim 9, wherein said cleaning agent comprises a volatile solution.

12. The method according to claim 9, wherein the drying temperature of said second drying process is about 10° C. to 70° C.

13. A method for forming a chitosan membrane containing a nano-particle, comprising:
providing a first feed comprising a chitosan;
providing a second feed comprising A type zeolite or clay, wherein a dispersion process is performed to fabricate said second feed, and said dispersion process comprises a solution to transform said A type zeolite or clay into a nano-particle and uniformly disperse said nano-particle, wherein said solution is organic-acid aqueous solution with a pH about 1.8 to 3.4;
performing a blending process to mix said first feed and said second feed, so as to form a mixture; and
performing a casting process for forming a chitosan membrane containing a nano-particle by said mixture with specific shape and thickness.

14. The method according to claim 13, wherein said method for forming said first feed comprises a dissolution process.

15. The method according to claim 14, wherein said dissolution process comprises an organic-acid aqueous solution to dissolve said chitosan therein.

16. The method according to claim 15, wherein said organic-acid aqueous solution further comprises an acetic-acid aqueous solution.

17. The method according to claim 14, wherein said method for forming said first feed further comprises an impurity removing process to remove impurities after said dissolution process.

18. The method according to claim 17, wherein said impurity removing process further comprises a filtration process.

19. The method according to claim 13, wherein said A type zeolite or clay is 1 wt % to 30 wt % of said second feed.

20. The method according to claim 13, wherein said A type zeolite or clay is 1 wt % to 75 wt % of said chitosan.

21. The method according to claim 13, when said second feed comprises clay, said solution is aqueous solution.

22. The method according to claim 21, wherein said mixture comprises a pH about 1.8 to 4.

23. The method according to claim 13, wherein said casting process comprises a first drying process.

24. The method according to claim 23, wherein the drying temperature of said first drying process increases with increasing concentration of said chitosan.

25. The method according to claim 23, wherein the drying time of said first drying process increases with increasing amount of the casting solution.

26. The method according to claim 23, wherein the drying temperature of said first drying process is about 10° C. to 100° C.

27. The method according to claim 13, further comprising a fixation process after said casting process, wherein said fixation process comprises:
performing a neutralization process for neutralizing said chitosan membrane containing a nano-inorganic particle by an alkaline solution and a by-product of neutralization is formed after said neutralization process;
performing a cleaning process to remove said product of neutralization from said chitosan membrane containing a nano-inorganic particle; and
performing a second drying process for removing the cleaning agent from said chitosan membrane containing a nano-inorganic particle.

28. The method according to claim 27, wherein said alkaline solution is about 1N to 10N.

29. The method according to claim 27, wherein said cleaning agent further comprises a volatile solution.

30. The method according to claim 27, wherein the drying temperature of said second drying process is about 10° C. to 70° C.

* * * * *

UNITED STATES PATENT AND TRADEMARK OFFICE
CERTIFICATE OF CORRECTION

| | | |
|---|---|---|
| PATENT NO. | : 7,094,372 B1 | Page 1 of 1 |
| APPLICATION NO. | : 10/460108 | |
| DATED | : August 22, 2006 | |
| INVENTOR(S) | : Da-Ming Wang et al. | |

It is certified that error appears in the above-identified patent and that said Letters Patent is hereby corrected as shown below:

IN THE TITLE PAGE:

Item (75), delete the inventor name "Juin-Yig Lai" and insert therefore the name --Juin-Yih Lai--.

Signed and Sealed this

Twenty-sixth Day of December, 2006

JON W. DUDAS
*Director of the United States Patent and Trademark Office*